United States Patent
Cooper et al.

(10) Patent No.: US 9,702,715 B2
(45) Date of Patent: Jul. 11, 2017

(54) DISTRIBUTED ENERGY MANAGEMENT SYSTEM AND METHOD FOR A VEHICLE SYSTEM

(71) Applicant: General Electric Company, Schenectady, NY (US)

(72) Inventors: Jared Klineman Cooper, Melbourne, FL (US); David Allen Eldredge, Melbourne, FL (US); Samuel William Golden, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/637,513

(22) Filed: Mar. 4, 2015

(65) Prior Publication Data

US 2015/0177012 A1 Jun. 25, 2015

Related U.S. Application Data (63) Continuation-in-part of application No. 13/653,440, filed on Oct. 17, 2012, now Pat. No. 9,126,608.

(51) Int. Cl.
*B60L 3/00* (2006.01)
*G01C 21/34* (2006.01)
*B61L 3/00* (2006.01)

(52) U.S. Cl.
CPC ......... *G01C 21/3415* (2013.01); *B61L 3/006* (2013.01)

(58) Field of Classification Search
None
See application file for complete search history.

(56) References Cited

U.S. PATENT DOCUMENTS

| | | |
|---|---|---|
| 2,059,160 A | 10/1936 | Wintsch |
| 2,104,601 A | 1/1938 | Young |
| 2,104,652 A | 1/1938 | Inman |
| 2,111,513 A | 3/1938 | Phinney |
| 2,148,005 A | 2/1939 | Allen et al. |
| 2,233,932 A | 3/1941 | Allen |
| 2,289,857 A | 7/1942 | Allen |
| 2,293,926 A | 8/1942 | Wallace |
| 2,366,802 A | 1/1945 | Pflasterer |

(Continued)

FOREIGN PATENT DOCUMENTS

DE 10226143 B4 2/2006

*Primary Examiner* — Mussa A Shaawat
*Assistant Examiner* — Abdhesh Jha
(74) *Attorney, Agent, or Firm* — Global Patent Operation; John A. Kramer (57) ABSTRACT

A system and method for generating a trip plan for a vehicle system determine a first trip plan for a trip of a vehicle system from a first location to a second location over a first route that includes a first intersection with a second route. The first trip plan designates operational settings of the vehicle system. An alternate trip plan that extends along the second route from the first intersection to the second location of the trip of the vehicle system also is determined. The first and alternate trip plans are determined prior to the vehicle system reaching the first intersection. Movement of the vehicle system is controlled according to the first trip plan prior to the vehicle system reaching the first intersection and then controlled according to the alternate trip plan responsive to the vehicle system deviating from the first trip plan.

17 Claims, 3 Drawing Sheets

(56) References Cited

U.S. PATENT DOCUMENTS

| | | |
|---|---|---|
| 2,601,634 A | 6/1952 | Rivette |
| 2,628,335 A | 2/1953 | Drake |
| 2,783,369 A | 2/1957 | Weber |
| 2,925,552 A | 2/1960 | Cowan et al. |
| 2,927,711 A | 3/1960 | Naggiar |
| 3,016,464 A | 1/1962 | Bailey |
| 3,137,756 A | 6/1964 | Gunther et al. |
| 3,246,141 A | 4/1966 | Ehrlich |
| 3,393,600 A | 7/1968 | Bess |
| 3,508,496 A | 4/1970 | Larson |
| 3,517,307 A | 6/1970 | Wallen, Jr. et al. |
| 3,519,805 A | 7/1970 | Throne-Booth |
| 3,537,401 A | 11/1970 | Metzner |
| 3,562,419 A | 2/1971 | Stewart et al. |
| 3,575,596 A | 4/1971 | Schatzel |
| 3,589,815 A | 6/1971 | Hosterman |
| 3,594,912 A | 7/1971 | Sauterel |
| 3,604,359 A | 9/1971 | Doorley et al. |
| 3,633,010 A | 1/1972 | Svetlichny |
| 3,650,216 A | 3/1972 | Harwick et al. |
| 3,655,962 A | 4/1972 | Koch |
| 3,696,243 A | 10/1972 | Risely |
| 3,718,040 A | 2/1973 | Freeman et al. |
| 3,781,139 A | 12/1973 | Lohse |
| 3,791,473 A | 2/1974 | Rosen |
| 3,794,833 A | 2/1974 | Blazek et al. |
| 3,805,056 A | 4/1974 | Birkin |
| 3,813,885 A | 6/1974 | Tabor |
| 3,821,558 A | 6/1974 | Mansfield |
| 3,821,932 A | 7/1974 | Theurer et al. |
| 3,828,440 A | 8/1974 | Plasser et al. |
| 3,850,390 A | 11/1974 | Geiger |
| 3,864,039 A | 2/1975 | Wilmarth |
| 3,865,042 A | 2/1975 | DePaola et al. |
| 3,870,952 A | 3/1975 | Sibley |
| 3,875,865 A | 4/1975 | Plasser et al. |
| 3,886,870 A | 6/1975 | Pelabon |
| 3,896,665 A | 7/1975 | Goel |
| 3,924,461 A | 12/1975 | Stover |
| 3,937,068 A | 2/1976 | Joy |
| 3,937,432 A | 2/1976 | Birkin |
| 3,948,314 A | 4/1976 | Creswick et al. |
| 3,960,005 A | 6/1976 | Vezina |
| 3,962,908 A | 6/1976 | Joy |
| 3,974,991 A | 8/1976 | Geiger |
| 3,987,989 A | 10/1976 | Geiger |
| 3,995,560 A | 12/1976 | Mackintosh |
| 4,003,019 A | 1/1977 | Tronel |
| 4,005,601 A | 2/1977 | Botello |
| 4,005,838 A | 2/1977 | Grundy |
| 4,022,408 A | 5/1977 | Staples |
| 4,040,738 A | 8/1977 | Wagner |
| 4,041,283 A | 8/1977 | Mosier |
| 4,042,810 A | 8/1977 | Mosher |
| 4,044,594 A | 8/1977 | Owens et al. |
| 4,062,419 A | 12/1977 | Kadota |
| 4,069,590 A | 1/1978 | Effinger |
| 4,075,632 A | 2/1978 | Baldwin et al. |
| 4,100,795 A | 7/1978 | Panetti |
| 4,117,463 A | 9/1978 | Norton |
| 4,117,529 A | 9/1978 | Stark et al. |
| 4,136,432 A | 1/1979 | Melley, Jr. |
| 4,143,553 A | 3/1979 | Martens et al. |
| 4,145,018 A | 3/1979 | Poggio et al. |
| 4,155,176 A | 5/1979 | Goel et al. |
| 4,159,088 A | 6/1979 | Cosley |
| 4,165,648 A | 8/1979 | Pagano |
| 4,173,073 A | 11/1979 | Fukazawa et al. |
| 4,174,636 A | 11/1979 | Pagano |
| 4,181,278 A | 1/1980 | Pascoe |
| 4,181,430 A | 1/1980 | Shirota et al. |
| 4,181,943 A | 1/1980 | Mercer, Sr. et al. |
| 4,198,164 A | 4/1980 | Cantor |
| 4,207,569 A | 6/1980 | Meyer |
| 4,214,647 A | 7/1980 | Lutts |
| 4,222,275 A | 9/1980 | Sholl et al. |
| 4,229,978 A | 10/1980 | Sholl et al. |
| 4,235,112 A | 11/1980 | Kaiser |
| 4,241,403 A | 12/1980 | Schultz |
| 4,253,399 A | 3/1981 | Spigarelli |
| 4,259,018 A | 3/1981 | Poirier |
| 4,262,209 A | 4/1981 | Berner |
| 4,279,395 A | 7/1981 | Boggio et al. |
| 4,288,855 A | 9/1981 | Panetti |
| 4,306,694 A | 12/1981 | Kuhn |
| 4,324,376 A | 4/1982 | Kuhn |
| 4,344,364 A | 8/1982 | Nickles et al. |
| 4,355,582 A | 10/1982 | Germer |
| 4,360,873 A | 11/1982 | Wilde et al. |
| 4,361,202 A | 11/1982 | Minovitch |
| 4,383,448 A | 5/1983 | Fujimoto et al. |
| 4,389,033 A | 6/1983 | Hardman |
| 4,391,134 A | 7/1983 | Theurer et al. |
| 4,401,035 A | 8/1983 | Spigarelli et al. |
| 4,417,466 A | 11/1983 | Panetti |
| 4,417,522 A | 11/1983 | Theurer et al. |
| 4,425,097 A | 1/1984 | Owens |
| 4,429,576 A | 2/1984 | Norris |
| 4,430,615 A | 2/1984 | Calvert |
| 4,457,178 A | 7/1984 | Turbe et al. |
| 4,467,430 A | 8/1984 | Even et al. |
| 4,468,966 A | 9/1984 | Bradshaw |
| 4,487,071 A | 12/1984 | Pagano et al. |
| 4,490,038 A | 12/1984 | Theurer et al. |
| 4,524,745 A | 6/1985 | Tominari et al. |
| 4,531,837 A | 7/1985 | Panetti |
| 4,538,061 A | 8/1985 | Jaquet |
| 4,541,182 A | 9/1985 | Panetti |
| 4,548,070 A | 10/1985 | Panetti |
| 4,548,164 A | 10/1985 | Ylonen et al. |
| 4,561,057 A | 12/1985 | Haley, Jr. et al. |
| 4,565,548 A | 1/1986 | Davis et al. |
| 4,577,494 A | 3/1986 | Jaeggi |
| 4,578,665 A | 3/1986 | Yang |
| 4,582,280 A | 4/1986 | Nichols et al. |
| 4,582,580 A | 4/1986 | Goudal et al. |
| 4,593,569 A | 6/1986 | Joy |
| 4,602,335 A | 7/1986 | Perlmutter |
| 4,609,870 A | 9/1986 | Lale et al. |
| 4,615,218 A | 10/1986 | Pagano |
| 4,625,412 A | 12/1986 | Bradshaw |
| 4,644,705 A | 2/1987 | Saccomani et al. |
| 4,654,973 A | 4/1987 | Worthy |
| 4,655,142 A | 4/1987 | Theurer et al. |
| 4,662,224 A | 5/1987 | Turbe |
| 4,663,713 A | 5/1987 | Cornell et al. |
| 4,689,995 A | 9/1987 | Turbe |
| 4,691,565 A | 9/1987 | Theurer |
| 4,700,223 A | 10/1987 | Shoutaro et al. |
| 4,700,574 A | 10/1987 | Turbe |
| 4,711,418 A | 12/1987 | Aver, Jr. et al. |
| 4,718,351 A | 1/1988 | Engle |
| 4,723,738 A | 2/1988 | Franke |
| 4,728,063 A | 3/1988 | Petit et al. |
| 4,735,384 A | 4/1988 | Elliott |
| 4,735,385 A | 4/1988 | Nickles et al. |
| 4,741,207 A | 5/1988 | Spangler |
| 4,763,526 A | 8/1988 | Pagano |
| 4,773,590 A | 9/1988 | Dash et al. |
| 4,794,548 A | 12/1988 | Lynch et al. |
| 4,827,438 A | 5/1989 | Nickles et al. |
| 4,843,575 A | 6/1989 | Crane |
| 4,853,883 A | 8/1989 | Nickles et al. |
| 4,886,226 A | 12/1989 | Frielinghaus |
| 4,915,504 A | 4/1990 | Thurston |
| 4,932,614 A | 6/1990 | Birkin |
| 4,932,618 A | 6/1990 | Davenport et al. |
| 4,944,474 A | 7/1990 | Jones |
| 4,979,392 A | 12/1990 | Guinon |
| 4,986,498 A | 1/1991 | Rotter et al. |
| 5,009,014 A | 4/1991 | Leach |
| 5,036,594 A | 8/1991 | Kesler et al. |
| 5,055,835 A | 10/1991 | Sutton |
| 5,086,591 A | 2/1992 | Panetti |

(56) References Cited

U.S. PATENT DOCUMENTS

| | | |
|---|---|---|
| 5,094,004 A | 3/1992 | Wooten |
| 5,101,358 A | 3/1992 | Panetti |
| 5,109,343 A | 4/1992 | Budway |
| 5,129,605 A | 7/1992 | Burns et al. |
| 5,133,645 A | 7/1992 | Crowley et al. |
| 5,134,808 A | 8/1992 | Panetti |
| 5,140,776 A | 8/1992 | Isdahl et al. |
| 5,161,891 A | 11/1992 | Austill |
| 5,177,684 A | 1/1993 | Harker et al. |
| 5,181,541 A | 1/1993 | Bodenheimer |
| 5,187,945 A | 2/1993 | Dixon |
| 5,197,438 A | 3/1993 | Kumano et al. |
| 5,197,627 A | 3/1993 | Disabato et al. |
| 5,199,176 A | 4/1993 | Theurer et al. |
| 5,201,294 A | 4/1993 | Osuka |
| 5,203,089 A | 4/1993 | Trefouel et al. |
| 5,230,613 A | 7/1993 | Hilsbos et al. |
| 5,240,416 A | 8/1993 | Bennington |
| 5,253,153 A | 10/1993 | Mathews et al. |
| 5,253,830 A | 10/1993 | Nayer et al. |
| 5,261,366 A | 11/1993 | Regueiro |
| 5,275,051 A | 1/1994 | De Beer |
| 5,277,156 A | 1/1994 | Osuka et al. |
| 5,301,548 A | 4/1994 | Theurer |
| 5,313,924 A | 5/1994 | Regueiro |
| 5,316,174 A | 5/1994 | Schutz |
| 5,339,692 A | 8/1994 | Shoenhair et al. |
| 5,341,683 A | 8/1994 | Searle |
| 5,353,512 A | 10/1994 | Theurer et al. |
| 5,357,912 A | 10/1994 | Barnes et al. |
| 5,363,787 A | 11/1994 | Konopasek et al. |
| 5,365,902 A | 11/1994 | Hsu |
| 5,386,727 A | 2/1995 | Searle |
| 5,388,034 A | 2/1995 | Allen et al. |
| 5,394,851 A | 3/1995 | Cryer et al. |
| 5,398,186 A | 3/1995 | Nakhla |
| 5,398,894 A | 3/1995 | Pascoe |
| 5,419,196 A | 5/1995 | Havira et al. |
| 5,420,883 A | 5/1995 | Swensen et al. |
| 5,429,329 A | 7/1995 | Wallace et al. |
| 5,433,111 A | 7/1995 | Hershey et al. |
| 5,433,182 A | 7/1995 | Augustin et al. |
| 5,437,422 A | 8/1995 | Newman |
| 5,441,027 A | 8/1995 | Buchanon et al. |
| 5,452,222 A | 9/1995 | Gray et al. |
| 5,459,663 A | 10/1995 | Franke |
| 5,459,666 A | 10/1995 | Casper et al. |
| 5,460,013 A | 10/1995 | Thomsen |
| 5,462,244 A | 10/1995 | Van Der Hoek et al. |
| 5,475,597 A | 12/1995 | Buck |
| 5,487,002 A | 1/1996 | Diller et al. |
| 5,487,516 A | 1/1996 | Murata et al. |
| 5,492,099 A | 2/1996 | Maddock |
| 5,522,265 A | 6/1996 | Jaeggi |
| 5,529,267 A | 6/1996 | Giras et al. |
| 5,533,695 A | 7/1996 | Heggestad et al. |
| 5,565,874 A | 10/1996 | Rode |
| 5,570,284 A | 10/1996 | Roselli et al. |
| 5,574,224 A | 11/1996 | Jaeggi |
| 5,574,649 A | 11/1996 | Levy |
| 5,574,659 A | 11/1996 | Delvers et al. |
| 5,578,758 A | 11/1996 | Havira et al. |
| 5,579,013 A | 11/1996 | Hershey et al. |
| 5,583,769 A | 12/1996 | Saitoh |
| 5,588,716 A | 12/1996 | Stumpe |
| 5,598,782 A | 2/1997 | Wiseman et al. |
| 5,600,558 A | 2/1997 | Mearek et al. |
| 5,605,099 A | 2/1997 | Sroka et al. |
| 5,605,134 A | 2/1997 | Martin |
| 5,613,442 A | 3/1997 | Ahola et al. |
| 5,618,179 A | 4/1997 | Copperman et al. |
| 5,623,244 A | 4/1997 | Cooper |
| 5,627,508 A | 5/1997 | Cooper et al. |
| 5,628,479 A | 5/1997 | Ballinger |
| 5,636,026 A | 6/1997 | Mian et al. |
| 5,642,827 A | 7/1997 | Madsen |
| 5,651,330 A | 7/1997 | Jewett |
| RE35,590 E | 8/1997 | Bezos et al. |
| 5,676,059 A | 10/1997 | Alt |
| 5,680,054 A | 10/1997 | Gauthier |
| 5,681,015 A | 10/1997 | Kull |
| 5,698,977 A | 12/1997 | Simpson et al. |
| 5,699,986 A | 12/1997 | Welk |
| 5,713,540 A | 2/1998 | Gerszberg et al. |
| 5,719,771 A | 2/1998 | Buck et al. |
| 5,720,455 A | 2/1998 | Kull et al. |
| 5,721,685 A | 2/1998 | Holland et al. |
| 5,735,492 A | 4/1998 | Pace |
| 5,738,311 A | 4/1998 | Fernandez |
| 5,740,547 A | 4/1998 | Kull et al. |
| 5,743,495 A | 4/1998 | Welles, II et al. |
| 5,751,144 A | 5/1998 | Weischedel |
| 5,755,349 A | 5/1998 | Brundle |
| 5,756,903 A | 5/1998 | Norby et al. |
| 5,758,299 A | 5/1998 | Sandborg et al. |
| 5,769,364 A | 6/1998 | Cipollone |
| 6,088,635 A | 7/2000 | Cox et al. |
| 6,092,021 A | 7/2000 | Ehlbeck et al. |
| 6,357,421 B1 | 3/2002 | Pritchard |
| 6,360,998 B1 | 3/2002 | Halvorson et al. |
| 6,363,331 B1 | 3/2002 | Kyrtsos |
| 6,377,215 B1 | 4/2002 | Halvorson et al. |
| 6,380,639 B1 | 4/2002 | Soucy |
| 6,404,129 B1 | 6/2002 | Hendricx et al. |
| 6,405,141 B1 | 6/2002 | Carr et al. |
| 6,415,522 B1 | 7/2002 | Ganz |
| 6,416,020 B1 | 7/2002 | Gronskov |
| 6,417,765 B1 | 7/2002 | Capanna |
| 6,421,606 B1 | 7/2002 | Asai et al. |
| 6,427,114 B1 | 7/2002 | Olsson |
| 6,441,570 B1 | 8/2002 | Grubba et al. |
| 6,443,123 B1 | 9/2002 | Aoki et al. |
| 6,459,964 B1 | 10/2002 | Vu et al. |
| 6,459,965 B1 | 10/2002 | Polivka et al. |
| 6,484,074 B1 | 11/2002 | Hazard et al. |
| 6,487,478 B1 | 11/2002 | Azzaro et al. |
| 6,487,488 B1 | 11/2002 | Peterson, Jr. et al. |
| 6,490,523 B2 | 12/2002 | Doner |
| 6,493,627 B1 | 12/2002 | Gallagher et al. |
| 6,499,339 B1 | 12/2002 | Hedstrom |
| 6,499,815 B1 | 12/2002 | Daigle |
| 6,501,393 B1 | 12/2002 | Richards et al. |
| 6,505,103 B1 | 1/2003 | Howell et al. |
| 6,515,249 B1 | 2/2003 | Valley et al. |
| 6,516,668 B2 | 2/2003 | Havira et al. |
| 6,520,124 B2 | 2/2003 | Bohm, II |
| 6,522,958 B1 | 2/2003 | Dwyer et al. |
| 6,523,787 B2 | 2/2003 | Braband |
| 6,525,658 B2 | 2/2003 | Streetman et al. |
| 6,533,223 B1 | 3/2003 | Ireland |
| 6,549,005 B1 | 4/2003 | Hay et al. |
| 6,549,803 B1 | 4/2003 | Raghavan et al. |
| 6,553,838 B2 | 4/2003 | Amini |
| 6,556,945 B1 | 4/2003 | Burggraf et al. |
| 6,557,526 B1 | 5/2003 | Hoshino |
| 6,564,172 B1 | 5/2003 | Till |
| 6,570,497 B2 | 5/2003 | Puckette, IV et al. |
| 6,571,636 B1 | 6/2003 | McWhorter |
| 6,584,953 B2 | 7/2003 | Yomogida |
| 6,585,085 B1 | 7/2003 | Kumar |
| 6,588,114 B1 | 7/2003 | Daigle |
| 6,591,263 B1 | 7/2003 | Becker et al. |
| 6,591,758 B2 | 7/2003 | Kumar |
| 6,604,421 B1 | 8/2003 | Li |
| 6,854,691 B2 | 2/2005 | Kraeling et al. |
| 6,862,502 B2 | 3/2005 | Peltz et al. |
| 7,140,477 B2 | 11/2006 | Engle et al. |
| 7,257,471 B2 | 8/2007 | Kornick et al. |
| 7,263,647 B2 | 8/2007 | Bryant et al. |
| 7,395,141 B1 | 7/2008 | Seck et al. |
| 7,523,893 B2 | 4/2009 | Francis et al. |
| 7,783,397 B2 | 8/2010 | Peltz et al. |
| 7,954,770 B2 | 6/2011 | Tomlinson, Jr. et al. |
| 8,126,601 B2 | 2/2012 | Kapp et al. |

(56) References Cited

U.S. PATENT DOCUMENTS

| | | |
|---|---|---|
| 8,266,092 B2 | 9/2012 | Kuhn et al. |
| 8,452,509 B2 | 5/2013 | Sujan et al. |
| 8,521,345 B2 | 8/2013 | Cooper et al. |
| 8,645,047 B2 | 2/2014 | Daum et al. |
| 8,655,518 B2 | 2/2014 | Cooper et al. |
| 2003/0187694 A1 | 10/2003 | Rowen |
| 2005/0090978 A1 | 4/2005 | Bathory et al. |
| 2007/0241237 A1 | 10/2007 | Foy et al. |
| 2008/0183490 A1* | 7/2008 | Martin ............... B61L 27/0027 705/1.1 |
| 2009/0187291 A1 | 7/2009 | Daum et al. |
| 2009/0198391 A1 | 8/2009 | Kumar et al. |
| 2010/0130124 A1 | 5/2010 | Teeter et al. |
| 2011/0060486 A1 | 3/2011 | Meltser et al. |
| 2012/0022728 A1 | 1/2012 | Hall et al. |
| 2012/0245766 A1 | 9/2012 | Cooper et al. |
| 2012/0277940 A1 | 11/2012 | Kumar et al. |
| 2012/0290185 A1 | 11/2012 | Cooper et al. |
| 2013/0035811 A1* | 2/2013 | Schroeck ............... B61C 15/14 701/19 |
| 2013/0131898 A1 | 5/2013 | Kumar et al. |
| 2013/0131909 A1 | 5/2013 | Cooper et al. |
| 2013/0261837 A1 | 10/2013 | Sharma et al. |
| 2013/0261856 A1 | 10/2013 | Sharma et al. |

\* cited by examiner

DISTRIBUTED ENERGY MANAGEMENT SYSTEM AND METHOD FOR A VEHICLE SYSTEM

CROSS-REFERENCE TO RELATED APPLICATIONS

This application is a continuation-in-part of, and claims priority to, U.S. application Ser. No. 13/653,440, filed 17 Oct. 2012, which is hereby incorporated by reference herein in its entirety.

FIELD

Embodiments of the inventive subject matter described herein relate to guiding or controlling movement of a vehicle system along routes.

BACKGROUND

Some known vehicle systems include several propulsion-generating vehicles that generate tractive effort for propelling the vehicle systems along a route. For example, trains may have several locomotives coupled with each other that propel the train along a track. These vehicle systems may optionally be referred to as vehicle consists. The vehicle consist may travel along a route toward a destination location according to a trip plan that dictates movements of the vehicle consist in order to reduce fuel consumption and/or emissions generation.

The routes traveled by vehicle consists may intersect with several other alternate routes. Due to the complexity of the trip plans, the trip plans may not accommodate for deviation of the vehicle consist along one or more of these alternate routes. As a result, when the vehicle consist leaves a planned route, a new trip plan may need to be created for the vehicle consist.

Because creation or revision of trip plans may be computationally complex processes, the revised trip plan may not be created quickly. For example, the vehicle consist may continue to move along the alternate route for a significant distance while the system that revises the trip plan is consumed with generating a new trip plan. Consequently, the vehicle consist may travel for a significant period of time without the aid of a revised trip plan to direct the vehicle consist along the alternate route. During travel along this alternate route without the trip plan, the vehicle consist may end up consuming more fuel and/or generating more emissions than is desired or allowed by law, regulation, or otherwise.

BRIEF DESCRIPTION

In one embodiment, a method (e.g., for generating a trip plan for a vehicle system) includes determining a first trip plan for a trip of a vehicle system from a first location to a second location over a first route that includes a first intersection with a second route. The first trip plan designates operational settings of the vehicle system as a function of one or more of time or distance along the trip. The method also includes determining an alternate trip plan for the vehicle system that extends along the second route from the first intersection between the first route and the second route to the second location of the trip of the vehicle system. The first trip plan and the alternate trip plan are determined prior to the vehicle system reaching the first intersection. The method also can include controlling movement of the vehicle system according to the first trip plan prior to the vehicle system reaching the first intersection and switching to controlling the movement of the vehicle system according to the alternate trip plan responsive to the vehicle system deviating from the first trip plan by traveling onto the second route from the first route through the first intersection.

In another embodiment, a system (e.g., a distributed energy management system) includes one or more first processors configured to be disposed onboard a vehicle system and configured to determine a first trip plan for a trip of the vehicle system from a first location to a second location over a first route that includes a first intersection with a second route. The first trip plan designates operational settings of the vehicle system as a function of one or more of time or distance along the trip. The system also can include one or more second processors configured to be disposed onboard the vehicle system and to determine an alternate trip plan for an alternate trip of the vehicle system. The alternate trip extends along the second route from the first intersection between the first route and the second route to the second location of the trip of the vehicle system. The one or more first processors are configured to determine the first trip plan and the one or more second processors are configured to determine the alternate trip plan prior to the vehicle system reaching the first intersection. The system also can include a control unit configured to one or more of autonomously control or direct manual control of movement of the vehicle system according to the first trip plan prior to the vehicle system reaching the first intersection. The control unit also is configured to switch to one or more of autonomously controlling or directing manual control of the movement of the vehicle system according to the alternate trip plan responsive to the vehicle system deviating from the first trip plan by traveling onto the second route from the first route through the first intersection.

In another embodiment, a system (e.g., a distributed energy management system) includes one or more first processors configured to be disposed onboard a first vehicle in a vehicle consist, one or more second processors configured to be disposed onboard a second vehicle in the vehicle consist, and a control unit configured to be disposed onboard the vehicle consist and to one or more of autonomously control or direct manual control of the vehicle consist according to a first trip plan that designates operational settings of the vehicle consist as a function of one or more of time or distance along a first route. Responsive to the vehicle consist deviating from the first trip plan by traveling from the first route to a second route, the one or more first processors are configured to determine a second trip plan that designates the operational settings of the vehicle consist as a function of one or more of time or distance along the second route. The one or more second processors can be configured to determine an alternate trip plan that designates the operational settings of the vehicle consist as a function of one or more of time or distance along a third route that intersects the second route at an upcoming intersection along a direction of travel of the vehicle consist.

BRIEF DESCRIPTION OF THE DRAWINGS

Reference is now made briefly to the accompanying drawings, in which.

DETAILED DESCRIPTION

Vehicle systems can include a single propulsion-generating vehicle, or may include multiple propulsion-generating vehicles arranged to travel together along a route as a group. For example, multiple-vehicle systems may include several vehicles mechanically coupled with each other or several vehicles that are not mechanically coupled, but that communicate with each other to coordinate movements of the vehicles such that the vehicles travel together along a direction of travel as a group. A vehicle system optionally may be referred to as a vehicle consist. The propulsion-generating vehicles may include rail vehicles (e.g., locomotives), automobiles, marine vessels, or the like. The vehicle system may include one or more non-propulsion-generating vehicles, such as rail cars or other vehicles that carry cargo.

One or more of the vehicles in a vehicle system may include an energy management system that generates trip plans for trips of the vehicle system. The trip plans can designate operational settings of the propulsion-generating vehicles in the vehicle system as a function of time and/or distance along a trip. Travelling according to the trip plan can cause the vehicle system to consume less fuel and/or generate fewer emissions than travelling according to operational settings that are not designated by the trip plan.

In some vehicle systems, multiple vehicles may include energy management systems. Alternatively, a single energy management system may be distributed among two or more vehicles in a single vehicle system. For example, two or more processors of the energy management system may be disposed onboard different vehicles in the same vehicle system. These types of energy management systems can be referred to as distributed energy management systems. In contrast, vehicle systems having only a single energy management system or multiple energy management systems with only a single energy management system creating a trip plan for the vehicle system can be referred to as non-distributed or centralized energy management systems.

One or more embodiments of the subject matter described herein distribute the processing of calculating trip plans across a vehicle system when more than one vehicle is equipped with the energy management system. In a vehicle system where a single energy management system on a single vehicle is doing all of the processing work to generate trip plans for the vehicle system, the centralized energy management system may be over taxed with processing requirements and, as a result, be unable to generate trip plans for alternate diverging routes along the planned route of the trip plan. In one embodiment of the systems and methods described herein, divergent planning of the trip plan is moved to other energy management systems of the vehicle system (or to other processors of a single energy management system distributed among vehicles). Divergent planning of a trip plan includes generating trip plans for routes other than the route of a current trip plan before the vehicle system leaves (e.g., diverges) from the route of the current trip plan. The current trip plan includes the trip plan that is currently being followed by the vehicle system.

By moving divergent planning to other energy management systems in the vehicle system, the efficiency by which the vehicle system operates can be improved. For example, in response to a vehicle system diverging from a current trip plan, a single centralized energy management system disposed on a single vehicle may only be able to generate an interim trip plan to cover an intermediate time period between a time at which the vehicle system diverges from the current trip plan and a later time at which the energy management system is able to complete creation of a replacement trip plan for the diverging route taken by the vehicle system. Because the interim trip plan is created relatively quickly to reduce the amount of time that the vehicle system is traveling without a trip plan and given the limited processing capability of the single energy management system, the interim trip plan may not be as efficient as a trip plan that is created with more time and/or more processing power. For example, traveling according to a first trip plan, an interim trip plan, and then a replacement trip plan created by a single energy management system may cause a vehicle system to consume more fuel and/or generate more emissions than traveling according to an alternate trip plan that was created with a distributed energy management system having increased processing capability and/or time to generate the alternate trip plan before the vehicle system reached the location where the vehicle system diverged from original (e.g., first) trip plan.

Figure 1:
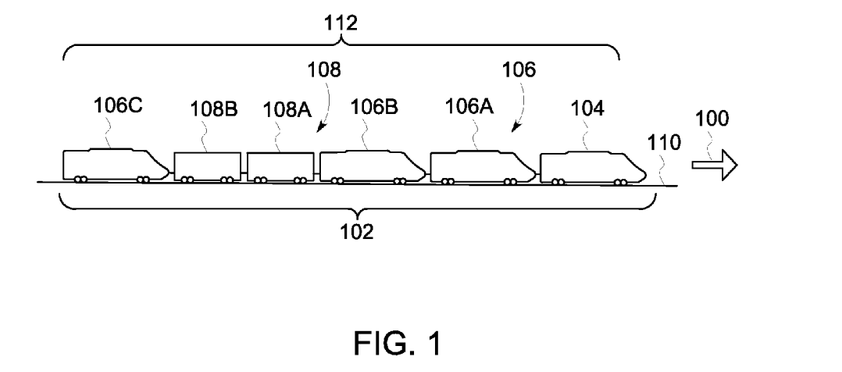
FIG. 1 illustrates one embodiment of a vehicle system having a distributed energy management system.

FIG. 1 illustrates one embodiment of a vehicle system 102 having a distributed energy management system 112. The illustrated vehicle system 102 includes propulsion-generating vehicles 104, 106 (e.g., vehicles 104, 106A, 106B, 106C) and non-propulsion-generating vehicles 108 (e.g., vehicles 108A, 108B) that travel together along a route 110 in a direction of travel 100. Although the vehicles 104, 106, 108 are shown as being mechanically coupled with each other, optionally, the vehicles 104, 106, 108 may not be mechanically coupled with each other.

The propulsion-generating vehicles 104, 106 are shown as locomotives, the non-propulsion-generating vehicles 108 are shown as rail cars, and the vehicle system 102 is shown as a train in the illustrated embodiment. Alternatively, the vehicles 104, 106 may represent other vehicles, such as automobiles, marine vessels, or the like, and the vehicle system 102 can represent a grouping or coupling of these other vehicles. The number and arrangement of the vehicles 104, 106, 108 in the vehicle system 102 are provided as one example and are not intended as limitations on all embodiments of the subject matter described herein.

In one embodiment, the group of vehicles 104, 106, 108 may be referred to as a vehicle system, with groups of one or more adjacent or neighboring propulsion-generating vehicles 104 and/or 106 being referred to as a vehicle consist. For example, the vehicles 104, 106A, 106B, 108A, 108B, and 106C may be referred to as a vehicle system with vehicles 104, 106A, 106B be referred to as a first vehicle consist of the vehicle system and the vehicle 106C referred to as a second vehicle consist in the vehicle system. Alternatively, the vehicle consists may be defined as the vehicles that are adjacent or neighboring to each ether, such as a vehicle consist defined by the vehicles 104, 106A, 106B, 108A, 108B, 106C.

The propulsion-generating vehicles 104, 106 can be arranged in a distributed power (DP) arrangement. For example, the propulsion-generating vehicles 104, 106 can include a lead vehicle 104 that issues command messages to the other propulsion-generating vehicles 106A, 106B, 106C which are referred to herein as remote vehicles. The designations "lead" and "remote" are not intended to denote spatial locations of the propulsion-generating vehicles 104, 106 in the vehicle system 102, but instead are used to indicate which propulsion-generating vehicle 104, 106 is communicating (e.g., transmitting, broadcasting, or a combination of transmitting and broadcasting) command messages and which propulsion-generating vehicles 104, 106 are being remotely controlled using the command messages. For example, the lead vehicle 104 may or may not be disposed at the front end of the vehicle system 102 (e.g., along a direction of travel of the vehicle system 102). Additionally, the remote vehicles 106A-C need not be separated from the lead vehicle 104. For example, a remote vehicle 106A-C may be directly coupled with the lead vehicle 104 or may be separated from the lead vehicle 104 by one or more other remote vehicles 106A-C and/or non-propulsion-generating vehicles 108.

The vehicle system 102 travels along the route 110 According to operational settings designated by a trip plan. The trip plan can dictate operational settings of the vehicles 104, 106 as a function of time and/or distance along the route 110, such as throttle settings, brake settings, speeds, accelerations, or the like. Traveling according to the trip plan can cause the vehicle system 102 to consume less fuel and/or generate fewer emissions than the same vehicle system 102 traveling along the same route according to different operational settings.

Figure 2:
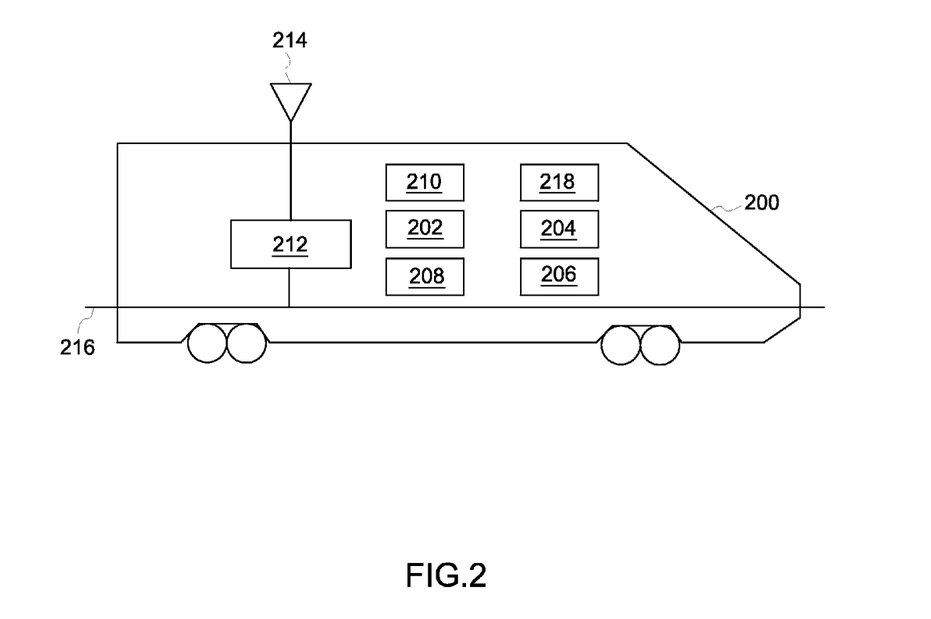
FIG. 2 is a schematic diagram of a vehicle in accordance with one embodiment.

FIG. 2 is a schematic diagram of a vehicle 200 in accordance with one embodiment. The vehicle 200 may represent one or more of the vehicles 104, 106 shown in FIG. 1. The distributed energy management system 112 shown in FIG. 1 may include one or more components onboard multiple vehicles 200 in a single vehicle system or vehicle consist.

The vehicle 200 includes a control unit 202 that controls operations of the vehicle 200. The control unit 202 can include or represent one or more hardware circuits or circuitry that include, are connected with, or that both include and are connected with one or more processors, controllers, or other hardware logic-based devices. The control unit 202 can be operably connected with several components as described herein by one or more wired and/or wireless connections.

The control unit 202 can be operably connected with an input device 204 and an output device 206. The control unit 202 can receive manual input from an operator of the vehicle 200 through the input device 204, such as a touchscreen, keyboard, electronic mouse, microphone, or the like. For example, the control unit 202 can receive manually input changes to the tractive effort, braking effort, speed, power output, and the like, from the input device 204. The control unit 202 can present information to the operator using the output device 206, which can represent a display screen (e.g., touchscreen or other screen), speakers, printer, or the like. For example, the control unit 202 can present the operational settings designated by a trip plan via the output device 206 so that an operator of the vehicle 200 can manually control the vehicle 200 (and/or other vehicles in the same vehicle system) according to the trip plan using the input device 204. Alternatively, the control unit 202 can automatically control the vehicle 200 (and/or other vehicles in the same vehicle system) according to the trip plan.

The control unit 202 can be operably connected with a propulsion subsystem 208 of the vehicle 200. The propulsion subsystem 208 provides tractive effort and/or braking effort of the vehicle 200. The propulsion subsystem 208 may include or represent one or more engines, motors, alternators, generators, brakes, batteries, turbines, and the like, that operate to propel the propulsion-generating vehicle 200 under the manual or autonomous control that is implemented by the control unit 200. For example, the control unit 200 can generate control signals autonomously or based on manual input that is used to direct operations of the propulsion subsystem 208 so that the vehicle 200 travels according to the operational settings dictated by the trip plan.

The control unit 202 also is connected with a communication unit 212 and a memory 218. The memory 218 can represent an onboard device that electronically and/or magnetically stores data. For example, the memory 218 may represent a computer hard drive, random access memory, read-only memory, dynamic random access memory, an optical drive, or the like. The communication unit 212 includes or represents hardware and/or software that is used to communicate with other vehicles 104, 106, 108, 200 in the vehicle system 102. For example, the communication unit 212 may include a transceiver and associated circuitry (e.g., antennas) 214 for wirelessly communicating (e.g., communicating and/or receiving) messages. Optionally, the communication unit 212 includes circuitry for communicating the messages over a wired connection 216, such as an electric multiple unit (eMU) line of the vehicle system 102 or another conductive pathway between or among the vehicles 104, 106, 108, 200 in the vehicle system 102.

The memory 218 can store trip plans, alternate trip plans, informational data used to create the trip plans, or other information. With respect to the information used to create trip plans, the memory 218 can store trip data, vehicle data, and/or route data. Vehicle data can include information about the vehicles and/or cargo being carried by the vehicle system 102. For example, vehicle data may represent cargo content (such as information representative of canto being transported by the vehicle system 1021 and/or vehicle information (such as model numbers, manufacturers, horsepower, and the like, of vehicles 104, 106, 108 in the vehicle system 102). Trip data can include information about an upcoming trip by the vehicle system 102. By way of example, trip data may include location information (such as the location, of a beginning location where the upcoming trip is to begin and/or the location of a final destination location where the upcoming trip is to end), restriction information (such as work zone identifications, or information on locations where the route. 110 is being repaired or is near another route 110 being repaired and corresponding speed/throttle limitations on the vehicle system 102), and/or operating mode information (such as speed/throttle limitations on the vehicle system 102 in various locations, slow orders, and the like). Route data can include information about the mute upon which the vehicle system 102 travels. For example, the route data can include information about locations of damaged segments of the route 110, locations of mute segments that are under repair or construction, the curvature and/or grade of the route 110, or the like.

The control unit 202 is operably connected with a local energy management system 210 ("EMS" in FIG. 2). The local energy management system 210 can represent one energy management system 210 of the distributed energy management system 112 shown in FIG. 1. For example, the local energy management system 210 can represent an energy management system that can independently create a trip plan for the vehicle 200 and/or the vehicle system 102. Other vehicles in the vehicle system may include additional local energy management systems 210 that form the distributed energy management system 112. The local energy management system 210 includes hardware circuits or circuitry that comprise and/or are connected with one or more processors (e.g., computer processors, controllers, microprocessors, or the like). The local energy management system 210 obtains data from the memory 218 and/or another location to generate trip plans for the vehicle system 102. The local energy management system 210 can communicate trip plans to other vehicles in the same vehicle system and/or to other local energy management systems 210 in the same vehicle system.

Figure 3:
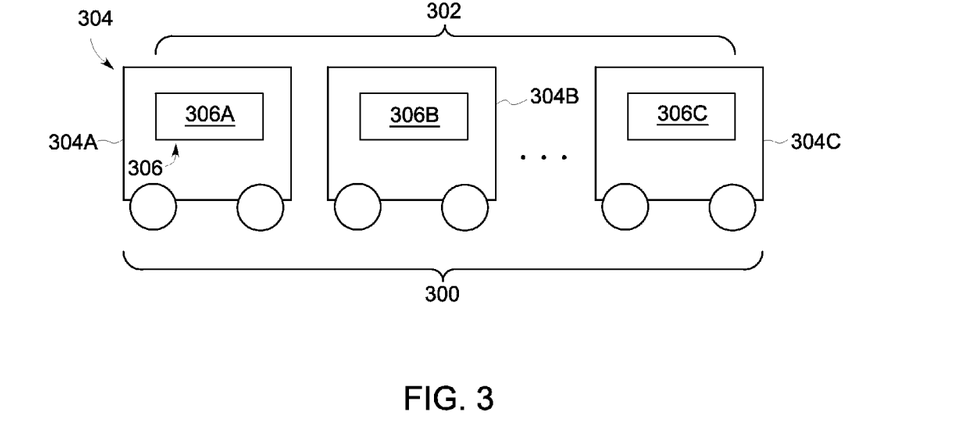
FIG. 3 illustrates another example of a distributed energy management system.

FIG. 3 illustrates another example of a distributed energy management system 302. The distributed energy management system 302 may represent the distributed energy management system 112 shown in FIG. 1. Also shown in FIG. 3 is a vehicle system 300 formed from several vehicles 304 (e.g., vehicles 304A-C). The vehicle system 300 may represent the vehicle system 102 shown in FIG. 1 and the vehicles 304 may represent one or more of the vehicles 104, 106, 200 shown in FIGS. 1 and 2.

The vehicles 304 each include a local energy management system 306 (e.g., local energy management systems 306A-C shown as "EMS #1," "EMS #2," and "EMS #n" in FIG. 3). While three vehicles 304 and three local energy management systems 306 are shown in FIG. 3, alternatively, a different number of vehicles 304 may be provided in the vehicle system 300 and/or a different number of local energy management systems 306 may be provided in the distributed energy management system 302. For example, the vehicle system 300 may include two vehicles 304 or may include more than three vehicles 304, and/or the distributed energy management system 302 may include two local energy management systems 306 or may include more than three local energy management systems 306.

The distributed energy management system 302 includes or is formed from the local energy management systems 306 disposed onboard the different vehicles 304. While each vehicle 304 in the vehicle system 300 is shown as including a local energy management system 306, alternatively, one or more of the vehicles 304 may not include a local energy management system 306. As described herein, different local energy management systems 306 disposed onboard different vehicles 304 of the same vehicle system 300 may create different trip plans for different routes of the same vehicle system 300 to travel on the same starting location to the same destination location. Alternatively, one or more of the trip plans may be created for the vehicle system 300 to travel to from a starting location to one or more intermediate locations between the starting location and the final destination location.

Figure 4:
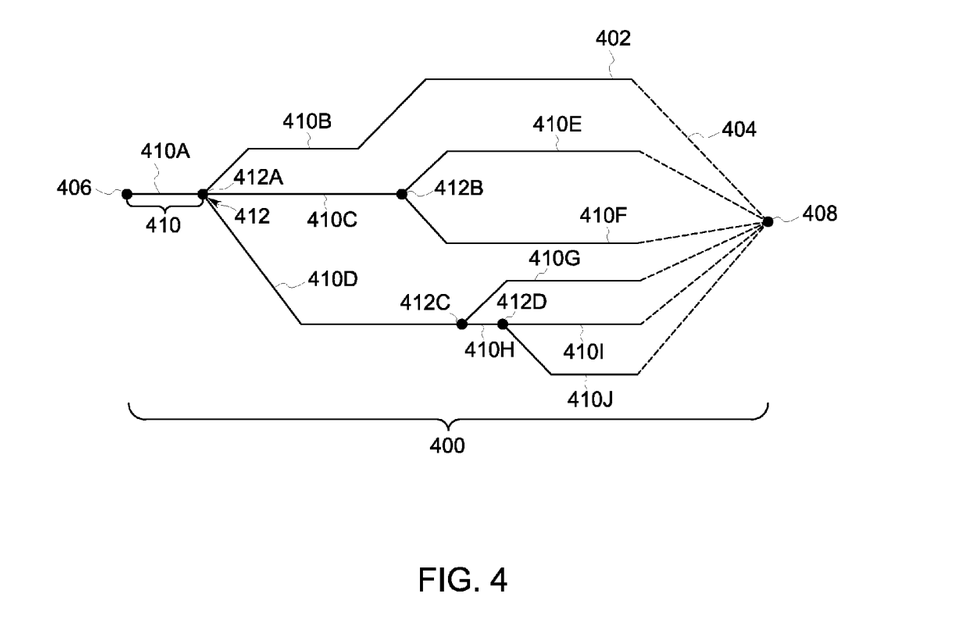
FIG. 4 illustrates one example of a transportation network.

FIG. 4 illustrates one example of a transportation network 400. The transportation network 400 is formed from several interconnected routes 402, 404. The routes 402, 404 include several route segments 410 (e.g., route segments 410A-410J). The route segments 410 extend between intersections 412 (e.g., intersections 412A-D) and/or between other locations. The intersections 412 represent intersections between two or more route segments 410. The route segment 410A extends from a starting location 406 and an intersection 412A between the route segment 410A and the route segments 410B, 410C, and 410D. In the illustrated example, the routes 402, 404 extend from the starting location 406 and a final destination location 408 for a trip of the vehicle system 102, 300. The routes 404 can represent a combination of route segments 410 that are not visible in FIG. 4.

A trip of the vehicle system 102, 300 can extend from the starting location 406 to the final destination location 408. The trip plans and alternate trip plans described in connection with FIG. 4 direct the vehicle systems 102, 300 to travel in directions that extend from the location 406 to the location 408. Alternatively, one or more of the trip plans may direct the vehicle system 102, 300 to travel in another direction.

The distributed energy management system 112, 302 can generate a trip plan for the vehicle system 102, 300 to travel from the starting location 406 to the final destination location 408. Optionally, the destination location 408 may not be a final destination of a trip of the vehicle system 102, 300, but may alternatively be an intermediate location between the starting location 406 and the final destination location 408 of a trip. Optionally, the starting location 406 may not be the initial starting location for a trip, but may alternatively be an intermediate location for a trip.

Different local energy management systems 210, 306 can generate different trip plans for the vehicle system 102, 300 to travel along different routes 402, 404 from the location 406 to the location 408. In one aspect, a first local energy management system 210, 306 can generate a first trip plan for the vehicle system 102, 300 to travel along the route segments 410A, 410C, and 410E from the location 406 to the location 408. This trip plan may be referred to as a primary or initial trip plan of the vehicle system 102, 300. Because extra processing capability is provided from other local energy management systems 210, 306 in the distributed energy management system 112, 302, other local energy management systems 210, 306 may create alternate trip plans for the vehicle system 102, 300 to travel from the location 406 to the location 408 along different routes 402, 404 than the first trip plan.

In one embodiment, different local energy management systems 210, 306 of the distributed energy management system 112, 302 may create different trip plans to extend from the same starting location 406 to the same destination location 408. For example, a first local energy management system 210, 306 may create a first trip plan that directs the vehicle system 102, 300 to travel from the location 406 to the location 408 along the route segments 410A, 410B. A different, second local energy management system 210, 306 may generate a different, second trip plan that directs the vehicle system 102, 300 to travel from the location 406 to the location 408 along a route formed by the segments 410A, 410C, 410E. A different, third local energy management system 210, 306 may generate a different, third trip plan that directs the vehicle system 102, 300 to travel along a route formed by the segments 410A, 410C, 410F. A different, fourth local energy management system 210, 306 may generate a different, fourth trip plan that directs the vehicle system 102, 300 to travel from the location 406 to the location 408 along a route formed by the segments 410A, 410D, 410G. A different, fifth local energy management system 210, 306 may generate a different, fifth trip plan that directs the vehicle system 102, 300 to travel from the location 406 to the location 408 along a route formed by the segments 410A, 410D, 410H, 410I. A different, sixth local energy management system 210, 306 may generate a different, sixth trip plan that directs the vehicle system 102, 300 to travel from the location 406 to the location 408 along a route formed by the segments 410A, 410D, 410H, 410J.

The trip plans that are created by the different local energy management systems 210, 306 may be generated based on locations of intersections 412 between the route segments 410. Different local energy management systems 210, 306 may create a trip plans depending on the number of permutations of combinations of route segments 410 that may be traveled by the vehicle system 102, 300. Optionally, the alternate trip plans generated by the local energy management systems 210, 306 may not extend entirely from the same location 406 to the same location 408 as other trip plans. The alternate trip plans may extend to a subsequent intersection 412 or other location, but not to the final destination location 408 of the trip.

The alternate trip plans may begin at upcoming intersections 412 between a route segment 410 being currently traveled by the vehicle system 102, 300 and one or more other route segments 410. For example, if a primary or first trip plan directs the vehicle system 102, 300 to travel along a route formed by the route segments 410A, 410B, a first alternate trip plan for the vehicle system 102, 300 traveling along the route segment 410A may direct the vehicle system 102, 300 to travel along the route segments 410C, 410E subsequent to the next, nearest, or upcoming intersection 412A along the direction of travel 100 of the vehicle system 102, 300. A second alternate trip plan created by a different local energy management system 210, 306 may direct the vehicle system 102, 300 to travel alone the route segments 410C, 410F following the intersection 412A. A third alternate trip plan created by a different local energy management system 210, 306 may direct the vehicle system 102, 300 to travel along the route segments 410D, 410G after the intersection 412A. A fourth alternate trip plan created by a different local energy management system 210, 306 may direct the vehicle system 102, 300 to travel along the route segments 410D, 410H, 410I after the intersection 412A. A fourth alternate trip plan created by a different local energy management system 210, 306 may direct the vehicle system 102, 300 to travel along the mute segments 410D, 410H, 410J after the intersection 412A.

Optionally, one or more of the alternate trip plans may extend partially, but not entirely to the final destination 408 of the first or primary trip plan. One or more of the alternate trip plans may extend to a subsequent intersection 412, but not to the same final destination of a current trip plan. For example, if a current trip plan generated by a first local energy management system 210, 306 directs the vehicle system 102, 300 to travel from the location 406 to the location 408 along a route formed from the route segments 410A, 410C, 410E, a different, first alternate trip plan generated by a different, second local energy management system 210, 306 can direct the vehicle system 102, 300 to travel from the intersection 412A to the location 408 along the route segment 410B. A different, second alternate trip plan generated by a different, third local energy management system 210, 306 can direct the vehicle system 102, 300 to travel from the intersection 412A to the intersection 412C along the route segment 410D. These alternate trip plans encompass scenarios where the vehicle system 102, 300 can deviate from the route dictated by the initial trip plan when the vehicle system 102, 300 passes through the intersection 412A but not along the route segment 410C as dictated by the current or primary trip plan.

The alternate trip plans can be generated by the local energy management systems 210, 306 prior to the vehicle system 102, 300 reaching an intersection 412, such as the nearest intersection 412 or next intersection 412 along the direction of travel 100 of the vehicle system 102, 300. Generating the alternate trip plans prior to the vehicle system 102, 300 reaching the next or nearest intersection 412 along the direction of travel 100 can allow for the vehicle system 102, 300 to have a trip plan that that is more "optimal" than creating an alternate trip plan after the vehicle system 102, 300 passes the intersection 412. For example, the previously created alternate trip plan may be more "optimal" in that the trip plan reduces fuel consumption and/or emissions generation more than an alternate trip plan formed after it is determined that the vehicle system 102, 300 diverges from a current trip plan (e.g., because more processing capability and/or time is available to create the alternate trip plan). For example, creating an alternate trip plan in advance of reaching a route segment 410 that is not included in a current trip plan can allow the distributed energy management system 112, 302 to spend additional processing time and/or processing capability to generate the alternate trip plan than if the alternate trip plan were created once it is determined that the vehicle system 102, 300 has diverged from the current trip plan.

The alternate trip plans may be generated for route segments 410 that intersect at an upcoming intersection 412 after the vehicle system 102, 300 has passed through a preceding intersection 412. For example, a current trip plan of the vehicle system 102, 300 can direct the vehicle system 102, 300 to travel along the route segments 410A, 410C, 410E. Prior to reaching the intersection 412A, a first alternate trip plan may have been generated that directs the vehicle system 102, 300 to travel from the intersection 412A to the intersection 412B along the route segment 410C, and a second alternate trip plan may have been generated that directs the vehicle system 102, 300 to travel from the intersection 412A to the intersection 412C along the route segment 410D. Optionally, one or more of these alternate trip plans may direct the vehicle system 102, 300 to travel along one or more additional route segments 410 subsequent to the intersection 412B and/or the intersection 412C.

The vehicle system 102, 300 may travel from the location 406 along the route segment 410A to the first intersection 412A according to the primary and current trip plan. Upon reaching the first intersection 412A, however, the vehicle system 102, 300 may diverge or deviate from the current trip plan. For example, the vehicle system 102, 300 can travel along the route segment 410B instead of the route segment 410C dictated by the current trip plan. Alternatively, the vehicle system 102, 300 may travel from the location 406 along the route segment 410A to the first intersection 412A according to the primary trip plan. The vehicle system 102, 300 can continue along the route segment 410C after passing through the first intersection 412A as directed by the primary trip plan.

Responsive to passing through the first intersection 412A, the distributed energy management system 112, 302 may generate one or more alternate trip plans for the vehicle system 102, 300 based on the changing or limited options for travel available to the vehicle system 102, 300. After passing through an intersection 412, the different combinations of route segments 410 that the vehicle system 102, 300 can travel along to the location 408 becomes more limited than prior to passing through the intersection 412. As a result, different alternate trip plans may be generated.

For example, after passing through the first intersection 412A and remaining on the route segment 410C designated by the primary trip plan, one or more local energy management systems 210, 306 of the distributed energy management system 112, 302 of the vehicle system 102, 300 may generate an alternate trip plan that directs the vehicle system 102, 300 to travel along the route segment 410A after the intersection 412B. If the vehicle system 102, 300 travels according to the primary trip plan and remains on the route segment 410E to the location 408D, then the alternate trip plans may be discarded. But, if the vehicle system 102, 300 deviates from the current trip plan and enters onto the route segment 410A after traveling through the intersection 412B, then the previously generated alternate trip plan that includes the route segment 410F may be implemented in place of the primary or current trip plan. This alternate trip plan can then become the current trip plan of the vehicle system 102, 300. The vehicle system 102, 300 may then continue to travel according to this alternate trip plan that has become the current trip plan along the route segment 410A toward the location 408.

In another example, the vehicle system 102, 300 may travel from the location 406 along the route segment 410A according to the first or primary trip plan. The vehicle system 102, 300 may deviate from the first trip plan by entering onto the route segment 410D after traveling through the intersection 412A. Responsive to entering onto the route segment 410D, the previously created alternate trip plan that includes the route segment 410D may be implemented or used in place of the primary or first trip plan. This alternate trip plan may become the current trip plan of the vehicle system 102, 300.

Responsive to deviating from the previous trip plan by entering onto the route segment 410D, one or more of the local energy management systems 210, 306 of the distributed energy management system 112, 302 may generate alternate trip plans for different options for the vehicle system 102, 300 to deviate from the current trip plan. For example, the current trip plan may direct the vehicle system 102, 300 to travel along the route segment 410D, 410G to the location 408. The local energy management system 210, 306B may generate an alternate trip plan that directs the vehicle system 102, 300 to travel on the route segment 410H if the vehicle system 102, 300 deviates from the current trip plan by traveling onto the route segment 410H after passing through the intersection 410C. In one aspect, this alternate trip plan may direct the vehicle system 102, 300 to travel for the entirety of the remainder of the trip by traveling along the route segment 410H and the route segment 410I to the location 408. Alternatively, the alternate trip plan may only direct the vehicle system 102, 300 to travel to a subsequent intersection, such as the intersection 412D. In another aspect, multiple alternate trip plans may be generated responsive to the vehicle system 102, 300 deviating from the current trip plan and traveling onto the route segment 410H after passing through the intersection 412C. For example, if the current trip plan directs the vehicle system 102, 300 to travel along the route segments 410D, 410G, the first alternate trip plan may be created by a first local energy management system 210, 306 and may direct the vehicle system to travel along the route segments 410H, 410I to the location 408 and a second alternate trip plan may be created by a second local energy management system 210, 306 that directs the vehicle system 102, 300 to travel along the route segments 410H, 410J to the location 408.

The trip plans may be communicated between the local energy management systems 210, 306 and/or the control units 202 of the vehicles 104, 106, 200, 304 in the vehicle system 102, 300 via one or more wired and/or wireless connections. For example, one or more of the alternate trip plans may be communicated between the vehicles 104, 106, 200, 304 in the vehicle system 102, 300 via the conductive communication pathway 216 extending along the vehicle system 102, 300 prior to the vehicle system 102, 300 reaching an upcoming or nearest intersection 412. This conductive communication pathway can include, as one example, a multiple unit (MU) cable extending between or among the vehicles 104, 106, 200, 304, a train line, an electrically controlled pneumatic (ECP) brake line, one or more bus bars, one or more cables, one or more wires, or the like. Optionally, one or more of the trip plans may be communicated between the vehicles 104, 106, 200, 304 via one or more wireless connections.

Figure 5:
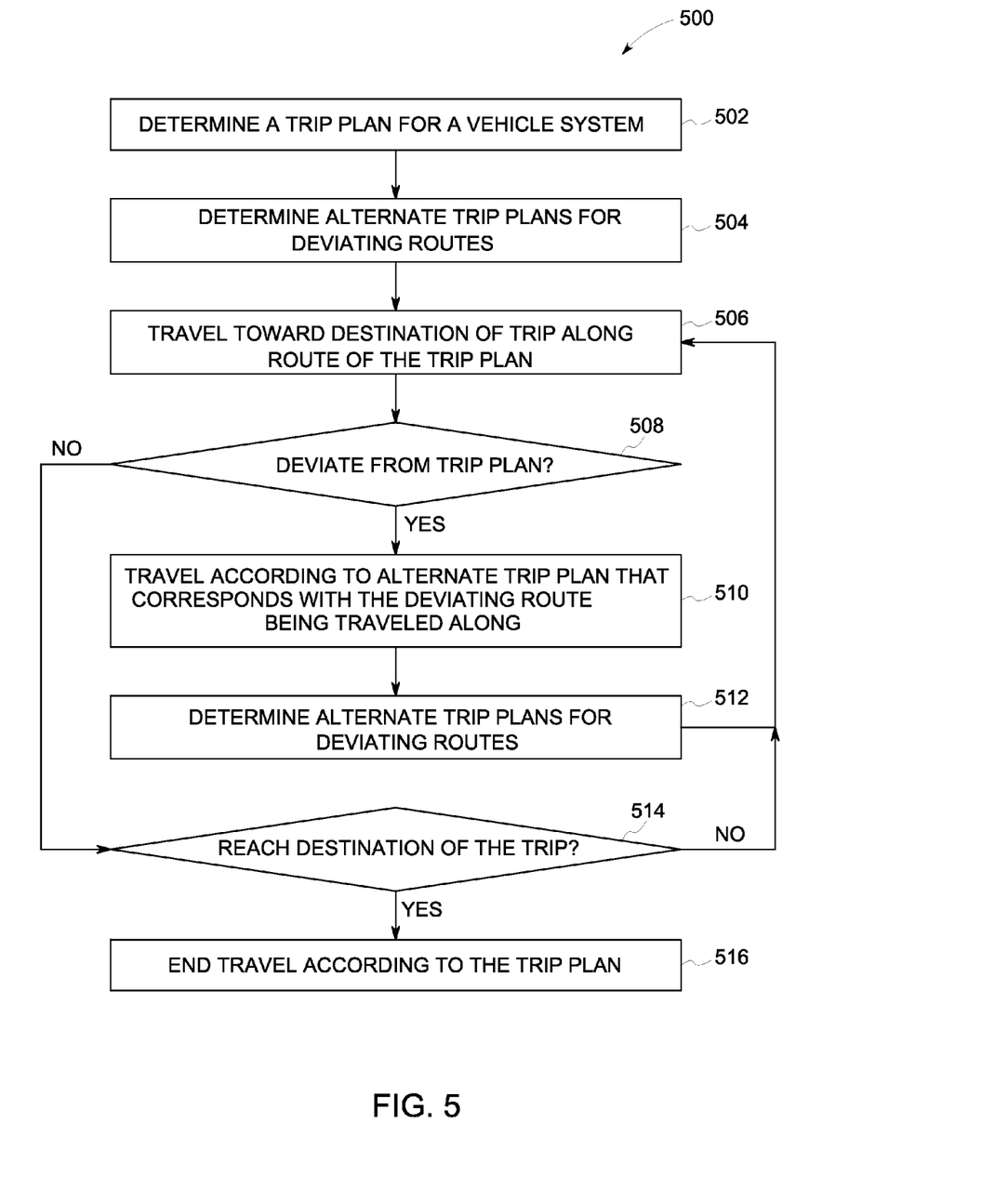
FIG. 5 illustrates a flowchart of one embodiment of a method for generating trip plans for a vehicle system.

FIG. 5 illustrates a flowchart of one embodiment of a method 500 for generating trip plans for a vehicle system. The method 500 may be performed by one or more embodiments of the distributed energy management systems 112, 302 described herein. The method 500 is described in the context of the transportation network 400 shown in FIG. 4, but alternatively may apply to different transportation networks.

At 502, a trip plan for a vehicle system is determined. This trip plan may dictate operational settings of the vehicle system as a function of time and/or distance along a route formed by one or more route segments, with the route extending from a starting location to a final destination location of a trip of the vehicle system. Alternatively, the trip plan may dictate the operational settings of the vehicle system from a starting location to an intermediate location between the starting location the final destination location, or from the intermediate location to the final destination location. This trip plan may be referred to as an initial, primary, or first trip plan. In one example, the trip plan can direct the vehicle system to travel along the route segments 410A, 410C, 410E from the location 406 to the location 408 shown in FIG. 4.

At 504, one or more alternate trip plans for deviating routes of the vehicle system are determined. The deviating routes include routes formed by one or more route segments that intersect the route or route segments of the current trip plan, but that are not included in the current trip plan. The deviating routes may be determined from an upcoming, next, or nearest intersection to the vehicle system along a direction of travel of the vehicle system along the route dictated by the current trip plan.

In continuing in continuing with the preceding example, the deviating routes include the route segments 410B, 410D that intersect the route segment 410A of the current trip plan at the intersection 412A. These deviating route segments 410B, 410D can form parts of deviating routes.

The alternate trip plans may be created prior to the vehicle system reaching the next, subsequent, or nearest intersection. For example, for a vehicle system traveling toward the intersection 412A along the route segment 410A, the alternate trip plans may be generated prior to the vehicle system reaching the intersection 412A.

At 506, the vehicle system travels toward a destination of the trip along the route dictated by the current trip plan. For example, the vehicle system 102, 300 can travel along the route segment 410A from the location 406 to the intersection 412A. At 508, a determination is made as to whether or not the vehicle system has deviated from the current trip plan. In continuing with the preceding example, a determination may be made as to whether the vehicle system traveled onto the route segment 410C of the current trip plan after passing through the intersection 412A. If the vehicle system travels according to the current trip plan and remains on the route segment 410C, then flow of the method 500 can proceed toward 514. On the other hand, if the vehicle system deviates from the current trip plan and does not remain on the route segment 410C after passing through the intersection 412A, then the vehicle system deviated from the trip plan and one or more alternate trip plans may need to be implemented and/or determined, as described below. In such a scenario, flow of the method 500 can proceed to 510, as described below. In continuing with the preceding example, the vehicle system travels onto the route segment 410C in accordance with the current trip plan.

At 514, a determination is made as to whether or not the vehicle system has reached a destination of the trip. Because the vehicle system is traveling along the route segment 410C toward the intersection 412B, the vehicle system has not yet reached the location 408 of the trip. As a result, the vehicle system has not reached the destination of the trip and flow of the method 500 may return to 506. On the other hand, if the vehicle system has reached the destination of the trip, then flow of the method 500 can proceed to 516, as described below.

Returning to 506, the vehicle system continues to travel for the destination of the trip along the route of the currently implement a trip plan. For example, the vehicle system can continue to travel along the route segment 410C toward the location 408. At 508, another determination is made as to whether or not the vehicle system has deviated from the trip plan. For example, responsive to the vehicle system reaching the intersection 412B, a determination is made as to whether or not the vehicle system traveled onto the route segment 410E and, as a result, continues to travel along according to the current trip plan. Or, if the vehicle system deviated from the current trip plan by traveling onto the route segment 410F after passing through the intersection 412B, then the vehicle system has deviated from the current trip plan and flow of the method 500 can proceed to 510, as described below.

If the vehicle system continued along the trip plan by traveling onto the route 410E after passing through the intersection 412B, then flow of the method 500 can proceed from 508 to 514. At 514, a determination is made as to whether or not the vehicle system has reached the destination of the trip. For example, if the vehicle system has reached the location 408 after traveling along the route segment 410E, then the vehicle system may have reached the final destination of the trip. As a result, flow of the method 500 can continue to 516 (described below). On the other hand, if the vehicle system is still traveling along the route 410E toward the location 408, then the vehicle system has not yet reached the final destination, and flow of the method 500 can return to 506.

In a variation of the preceding example, if the vehicle system deviated from the trip plan by moving onto the route segment 410B after moving through the intersection 412A instead of traveling onto the route segment 410C as directed by the current trip plan, then it is determined at 508 that the vehicle system deviated from the trip plan. As a result, flow of the method 500 can proceed from 508 to 510. At 510, the vehicle system travels according to the alternate trip plan that corresponds to the deviating route being traveled along by the vehicle system. For example, the vehicle system may travel according to the alternate trip plan that directs the vehicle system to travel along the route segment 410B to the destination location 408. This alternate trip plan may now become the current trip plan of the vehicle system as this is the trip plan being currently implemented by the vehicle system for travel.

At 512, one or more alternate trip plans for deviating routes of the currently implemented trip plan (which was previously an alternate trip plan) are determined. The alternate trip plans may be determined by identifying upcoming intersections 412 between a route of the current trip plan and diverging routes that are not included in the current trip plan. Based on these intersections and/or diverging routes that are identified, the distributed energy management system can determine one or more alternate trip plans. For example, different local energy management systems may form different trip plans based on different combinations of the diverging routes and intersections. In continuing the preceding example, because there are no deviating routes that intersect with the route segment 410B subsequent to the intersection 410A, then no alternate trip plans are determined at 512. Flow of the method 500 can return to 506.

At 506, the vehicle system continues to travel along the route segment 410B toward the final destination location 408. At 508, a determination is made as to whether or not the vehicle system deviates from the current trip plan. Because the vehicle system is unable to travel off of the route segment 410B, the vehicle system cannot deviate from the currently implement a trip plan. As a result, flow of the method can proceed to 514. The method 500 may then proceed in a loop-wise manner between the operations described in connection with 514, 506, and 508 until the vehicle system reaches the final destination location 408. At that point, flow of the method 500 can proceed from 514 to 516.

In another variation of the preceding example, the vehicle system may deviate from the trip plan that directs the vehicle system to travel along the route segments 410A, 410C, 410E by traveling through the intersection 412B and onto the route segment 410F. This deviation may be identified at 508, and the vehicle system may then travel according to an alternate trip plan associated with the route segment 410F, as described above in connection with 510. Because no deviating routes intersect the route segment 410F subsequent to the intersection 412B, no alternate trip plans may be generated at 512, and the vehicle system may continue to travel to the location 408.

In another variation the preceding example, the vehicle system may deviate from the trip plan that directs the vehicle system to travel along the route segments 410A, 410C, 410E, by traveling onto the route segment 410D after traveling through the intersection 412A. In such a scenario, at 508, the method 500 determines that the vehicle system has deviated from the current trip plan. As a result, flow of the method proceeds to 510.

At 510, the vehicle system implements the previously created alternate trip plan associated with the route segment 410D. This alternate trip plan for the route segment 410D may be created prior to the vehicle system reaching the intersection 412A. Upon deviating from the previous trip plan, the alternate trip plan associated with the route segment 410D may replace the current trip plan and be implemented as the new, current trip plan of the vehicle system. This new, current trip plan of the vehicle system may direct the vehicle system to travel along the route segment 410D to the intersection 412C, and then along the route segment 410G to the location 408.

At 512, one or more alternate trip plans for deviating routes from the current trip plan are determined. With respect to the preceding example, an alternate trip plan may be determined that directs the vehicle system to travel from the intersection 412C to the intersection 412D along the route segment 410H. If multiple alternate trip plans are to be determined, such as for distances farther away than the intersection 412D, then a first alternate trip plan may be determined that directs the vehicle system to travel from intersection 412C to location 408 along the route segments 410H and 410I, and a second alternate trip plan may be determined that directs a vehicle system to travel from intersection 412C to location 408 along the route segments 410H and 410J. Flow of the method 500 may then return to 506.

At 506, the vehicle system travels toward the destination of the trip along the route of the current trip plan. For example, the vehicle system may travel along the route segment 410D toward the location 408. At 508, a determination is made as to whether or not the vehicle system deviates from the current trip plan. For example, if the vehicle system enters onto the route segment 410H after passing through the intersection 412C, then the vehicle system deviates from the trip plan, and flow of the method 500 can proceed to 510. On the other hand, if the vehicle system is traveling on the mute segment 410G as dictated by the current trip plan, then the vehicle system does not deviate from the trip plan and flow of the method 500 can proceed to 514. As described above, in such a scenario, the method 500 may continue to proceed in a loop-wise manner between operations described in connection with 514, 506, and 50 until the vehicle system reaches the destination location 408. At that point, flow of the method 500 can proceed toward 516.

If the vehicle system deviates from the current trip plan at 508 by traveling to the route segment 410H after traveling to the intersection 412C, then flow of the method 500 can proceed to 510. As described above, at 510, the alternate trip plan associated with the route segment 410H may be implemented as the new, current trip plan of the vehicle system. In an embodiment where multiple alternate trip plans both include the route segment 410H (such as were a first alternate trip plan includes a route segments 410H, 410I and another alternate trip plan includes the route segments 410H and 410J), then a selected one of the alternate trip plans may be implemented. One of the alternate trip plans may be selected for implementation by a control unit onboard the vehicle system. The alternate trip plan that is selected may be the trip plan that is calculated, expected, or estimated to reduce fuel consumption and/or emissions generation more than the other alternate trip plans. Optionally, the alternate trip plan that is selected may be the trip plan that is calculated, expected, or estimated to cause the vehicle system to reach the location 408 sooner than other alternate trip plans. Alternatively, another technique may be used to select the alternate trip plan.

At 512, alternate trip plans fir deviating routes from the new, current trip plan are determined. For example, if the new, current trip plan of the vehicle system directs the vehicle system to travel along the route segments 410H, 410J to the location 408, then an alternate trip plan may be determined that directs the vehicle system to travel from the intersection 412D to the location 408 along the route segment 410I.

At 514, a determination is made as to whether or not the vehicle system has reached the destination of the trip. Because the vehicle system is traveling along the route segment 410H, the vehicle system has not reached location 408. As a result, flow of the method 500 returns to 506. At 506, the vehicle system continues to travel along the route segment 410H toward the location 408.

At 508, a determination is made as to whether or not the vehicle system has deviated from the trip plan. For example, if the vehicle system travels on the route segment 410J after traveling through the intersection 412D, then the vehicle system continues to travel according to the current trip plan. As a result, flow of the method 500 can proceed in a loop between the operations described in connection with 514, 506, and 508 until the vehicle system reaches the location 408, as described above. On the other hand, if the vehicle system travels on the route segment 410I after traveling to the intersection 412D, then the vehicle system has deviated from the current trip plan. As a result, flow of the method can proceed toward 510.

At 510, the alternate trip plan associated with travel along the route segment 410I replaces the current trip plan of the vehicle system and the vehicle system travels along the route segment 410I according to the new, current trip plan. As described above, no alternate trip plans may be determined for deviating routes at 512 because there are no deviating routes that intersect with the route segment 410I between the intersection 412D and the location 408. As a result, flow of the method 500 can return to 506 and proceed in a loop-wise manner between 506, 508, and 514 until the vehicle system reaches the location 408.

At 514, once the vehicle system has reached the destination location of the trip, such as by reaching location 408, flow of the method can proceed to 516. At 516, travel according to the trip plan may terminate. Alternatively, flow of the method 500 may proceed for war one or more additional segments of the trip, or one or more trips of the vehicle system.

In one embodiment, a method (e.g., for generating a trip plan for a vehicle system) includes determining a first trip plan for a trip of a vehicle system from a first location to a second location over a first route that includes a first intersection with a second route. The first trip plan designates operational settings of the vehicle system as a function of one or more of time or distance along the trip. The method also includes determining an alternate trip plan for the vehicle system that extends along the second route from the first intersection between the first route and the second route to the second location of the trip of the vehicle system. The first trip plan and the alternate trip plan are determined prior to the vehicle system reaching the first intersection. The method also can include controlling movement of the vehicle system according to the first trip plan prior to the vehicle system reaching the first intersection and switching to controlling the movement of the vehicle system according to the alternate trip plan responsive to the vehicle system deviating from the first trip plan by traveling onto the second route from the first route through the first intersection.

In one aspect, determining the first trip plan can be performed by one or more first processors disposed onboard a first vehicle in the vehicle system that includes the first vehicle and at least a second vehicle configured to travel together during the trip. Determining the alternate trip plan can be performed by one or more second processors disposed onboard the second vehicle of the vehicle system.

In one aspect, the method also can include communicating the alternate trip plan from the second vehicle to the first vehicle via a conductive communication pathway extending along the vehicle system prior to the vehicle system reaching the first intersection.

In one aspect, communicating the alternate trip plan can include communicating the alternate trip plan via a multiple unit cable extending between the first vehicle and at least the second vehicle.

In one aspect, each of the first trip plan and the alternate trip plan can be determined such that the first trip plan and the alternate trip plan designate the operational settings of the vehicle system to the second location.

In one aspect, responsive to the vehicle system deviating from the first trip plan by moving from the first route to the second route at the first intersection, the method also can include determining one or more additional intersections disposed along the second route and one or more additional routes that diverge from the second route at the one or more additional intersections, and determining one or more additional alternate trip plans associated with travel of the vehicle system along the respective one or more additional routes.

In one aspect, determining the one or more additional alternate trip plans can occur prior to the vehicle system reaching a closest intersection of the one or more additional intersections relative to a location of the vehicle system and a direction of travel of the vehicle system along the second route.

In one aspect, determining each of the one or more additional alternate trip plans can be performed by a different set of one or more processors disposed onboard a different vehicle of plural vehicles included in the vehicle system.

In one aspect, the one or more additional alternate trip plans can be determined such that each of the one or more additional alternate trip plans designates the operational settings of the vehicle system to the second location.

In one aspect, determining the first trip plan and determining the alternate trip plan can include designating one or more of a throttle setting, a brake setting, and/or a speed as the function of one or more of time or distance as the operational settings of the vehicle system.

In another embodiment, a system (e.g., a distributed energy management system) includes one or more first processors configured to be disposed onboard a vehicle system and configured to determine a first trip plan for a trip of the vehicle system from a first location to a second location over a first route that includes a first intersection with a second route. The first trip plan designates operational settings of the vehicle system as a function of one or more of time or distance along the trip. The system also can include one or more second processors configured to be disposed onboard the vehicle system and to determine an alternate trip plan for an alternate trip of the vehicle system. The alternate trip extends along the second route from the first intersection between the first route and the second route to the second location of the trip of the vehicle system. The one or more first processors are configured to determine the first trip plan and the one or more second processors are configured to determine the alternate trip plan prior to the vehicle system reaching the first intersection. The system also can include a control unit configured to one or more of autonomously control or direct manual control of movement of the vehicle system according to the first trip plan prior to the vehicle system reaching the first intersection. The control unit also is configured to switch to one or more of autonomously controlling or directing manual control of the movement of the vehicle system according to the alternate trip plan responsive to the vehicle system deviating from the first trip plan by traveling onto the second route from the first route through the first intersection.

In one aspect, the one or more first processors can be configured to be disposed onboard a first vehicle in the vehicle system that includes the first vehicle and at least a second vehicle configured to travel together during the trip. The one or more second processors can be configured to be disposed onboard the second vehicle of the vehicle system.

In one aspect, the one or more second processors can be configured to direct communication of the alternate trip plan from the second vehicle to the first vehicle via a conductive communication pathway extending along the vehicle system prior to the vehicle system reaching the first intersection.

In one aspect, the communication pathway can include a multiple unit cable extending between the first vehicle and at least the second vehicle.

In one aspect, at least one of the one or more first processors and/or the one or more second processors can be configured to, responsive to the vehicle system deviating from the first trip plan by moving from the first route to the second route at the first intersection, determine one or more additional intersections disposed along the second route and one or more additional routes that diverge from the second route at the one or more additional intersections, and determine one or more additional alternate trip plans associated with travel of the vehicle system along the respective one or more additional routes.

In one aspect, the at least one of the one or more first processors and/or the one or more second processors can be configured to determine the one or more additional alternate trip plans such that each of the one or more additional alternate trip plans designate the operational settings of the vehicle system to the second location.

In one aspect, the one or more first processors can be configured to determine the first trip plan and the one or more second processors are configured to determine the alternate trip plan include by designating one or more of a throttle setting, a brake setting, and/or a speed as the function of one or more of time or distance as the operational settings of the vehicle system.

In another embodiment, a system (e.g., a distributed energy management system) includes one or more first processors configured to be disposed onboard a first vehicle in a vehicle consist, one or more second processors configured to be disposed onboard a second vehicle in the vehicle consist, and a control unit configured to be disposed onboard the vehicle consist and to one or more of autonomously control or direct manual control of the vehicle consist according to a first trip plan that designates operational settings of the vehicle consist as a function of one or more of time or distance along a first route. Responsive to the vehicle consist deviating from the first trip plan by traveling from the first route to a second route, the one or more first processors are configured to determine a second trip plan that designates the operational settings of the vehicle consist as a function of one or more of time or distance along the second route. The one or more second processors can be configured to determine an alternate trip plan that designates the operational settings of the vehicle consist as a function of one or more of time or distance along a third route that intersects the second route at an upcoming intersection along a direction of travel of the vehicle consist.

In one aspect, the one or more second processors can be configured to determine the alternate trip plan prior to the vehicle consist reaching the upcoming intersection between the second route and the third route.

In one aspect, the one or more second processors can be configured to communicate the alternate trip plan to the first vehicle via a multiple unit cable extending between the first vehicle and at least the second vehicle in the vehicle consist.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
    determining, using a first energy management system disposed onboard a first vehicle of a vehicle system, a first trip plan for a trip of the vehicle system from a first location to a second location over a first route that includes a first intersection with a second route, the first trip plan designating operational settings of the vehicle system for one or more of different times or different locations ahead of the vehicle system along the first route;
    determining, using a second energy management system disposed onboard a second vehicle of the vehicle system, an alternate trip plan for the vehicle system, the alternate trip plan designating operational settings of the vehicle system for one or more of different times or different locations ahead of the vehicle system along the second route from the first intersection between the first route and the second route to the second location of the trip of the vehicle system, wherein the first trip plan and the alternate trip plan are determined prior to the vehicle system reaching the first intersection;
    controlling movement of the vehicle system using a control unit, the movement of the vehicle system controlled by the control unit according to the first trip plan prior to the vehicle system reaching the first intersection;
    switching, using the control unit, to controlling the movement of the vehicle system according to the alternate trip plan responsive to the vehicle system deviating from the first trip plan by traveling onto the second route from the first route through the first intersection;
    responsive to the vehicle system deviating from the first trip plan by moving from the first route to the second route at the first intersection, determining one or more additional intersections disposed along the second route and one or more additional routes that diverge from the second route at the one or more additional intersections; and
    determining one or more additional alternate trip plans associated with travel of the vehicle system along the respective one or more additional routes.

2. The method of claim 1, wherein determining the first trip plan is performed by one or more first processors of the first energy management system, and wherein determining the alternate trip plan is performed by one or more second processors of the second energy management system.

3. The method of claim 2, further comprising communicating the alternate trip plan from the second vehicle to the first vehicle via a conductive communication pathway extending along the vehicle system prior to the vehicle system reaching the first intersection.

4. The method of claim 3, wherein communicating the alternate trip plan includes communicating the alternate trip plan via a multiple unit cable extending between the first vehicle and at least the second vehicle.

5. The method of claim 1, wherein each of the first trip plan and the alternate trip plan is determined such that the first trip plan and the alternate trip plan designate the operational settings of the vehicle system to the second location.

6. The method of claim 1, wherein determining the one or more additional alternate trip plans occurs prior to the vehicle system reaching a closest intersection of the one or more additional intersections relative to a location of the vehicle system and a direction of travel of the vehicle system along the second route.

7. The method of claim 1, wherein determining each of the one or more additional alternate trip plans is performed by a different set of one or more processors disposed onboard a different vehicle of plural vehicles included in the vehicle system.

8. The method of claim 1, wherein the one or more additional alternate trip plans are determined such that each of the one or more additional alternate trip plans designates the operational settings of the vehicle system to the second location.

9. The method of claim 1, wherein determining the first trip plan and determining the alternate trip plan include designating one or more of a throttle setting, a brake setting, or a speed as the function of one or more of time or distance as the operational settings of the vehicle system.

10. A system comprising:
one or more first processors of a first energy management system configured to be disposed onboard a first vehicle of a vehicle system, the one or more first processors configured to determine a first trip plan for a trip of the vehicle system from a first location to a second location over a first route that includes a first intersection with a second route, the first trip plan designating operational settings of the vehicle system for one or more of different times or different locations ahead of the vehicle system along the first route;
one or more second processors of a second energy management system configured to be disposed onboard a second vehicle of the vehicle system and to determine an alternate trip plan for an alternate trip of the vehicle system, the alternate trip designating operational settings of the vehicle system for one or more of different times or different locations ahead of the vehicle system along the second route from the first intersection between the first route and the second route to the second location, wherein the one or more first processors are configured to determine the first trip plan and the one or more second processors are configured to determine the alternate trip plan prior to the vehicle system reaching the first intersection; and
a control unit configured to one or more of autonomously control or direct manual control of movement of the vehicle system according to the first trip plan prior to the vehicle system reaching the first intersection, wherein the control unit also is configured to switch to one or more of autonomously controlling or directing manual control of the movement of the vehicle system according to the alternate trip plan responsive to the vehicle system deviating from the first trip plan by traveling onto the second route from the first route through the first intersection,
wherein at least one of the one or more first processors or the one or more second processors are configured to, responsive to the vehicle system deviating from the first trip plan by moving from the first route to the second route at the first intersection:
determine one or more additional intersections disposed along the second route and one or more additional routes that diverge from the second route at the one or more additional intersections, and
determine one or more additional alternate trip plans associated with travel of the vehicle system along the respective one or more additional routes.

11. The system of claim 10, wherein the one or more second processors are configured to direct communication of the alternate trip plan from the second vehicle to the first vehicle via a conductive communication pathway extending along the vehicle system prior to the vehicle system reaching the first intersection.

12. The system of claim 11, wherein the communication pathway includes a multiple unit cable extending between the first vehicle and at least the second vehicle.

13. The system of claim 10, wherein the at least one of the one or more first processors or the one or more second processors are configured to determine the one or more additional alternate trip plans such that each of the one or more additional alternate trip plans designate the operational settings of the vehicle system to the second location.

14. The system of claim 10, wherein the one or more first processors are configured to determine the first trip plan and the one or more second processors are configured to determine the alternate trip plan include by designating one or more of a throttle setting, a brake setting, or a speed as the function of one or more of time or distance as the operational settings of the vehicle system.

15. A system comprising:
one or more first processors of a first energy management system configured to be disposed onboard a first vehicle in a vehicle consist;
one or more second processors of a second energy management system configured to be disposed onboard a second vehicle in the vehicle consist; and
a control unit configured to be disposed onboard the vehicle consist and to one or more of autonomously control or direct manual control of the vehicle consist according to a first trip plan that designates operational settings of the vehicle consist for one or more of different times or different locations along a first route ahead of the vehicle consist,
wherein, responsive to the vehicle consist deviating from the first trip plan by traveling from the first route to a second route, the one or more first processors are configured to determine a second trip plan that designates the operational settings of the vehicle consist for one or more of different times or different locations along the second route ahead of the vehicle consist, and the one or more second processors are configured to determine an alternate trip plan that designates the operational settings of the vehicle consist for one or more of different times or different locations ahead of the vehicle consist along a third route that intersects the second route at an upcoming intersection along a direction of travel of the vehicle consist,
wherein at least one of the one or more first processors or the one or more second processors are configured to, responsive to the vehicle consist deviating from the first trip plan by moving from the first route to the second route at the first intersection:
determine one or more additional intersections disposed along the second route and one or more additional routes that diverge from the second route at the one or more additional intersections, and
determine one or more additional alternate trip plans associated with travel of the vehicle consist along the respective one or more additional routes.

16. The system of claim 15, wherein the one or more second processors are configured to determine the alternate trip plan prior to the vehicle consist reaching the upcoming intersection between the second route and the third route.

17. The system of claim 15, wherein the one or more second processors are configured to communicate the alternate trip plan to the first vehicle via a multiple unit cable extending between the first vehicle and at least the second vehicle in the vehicle consist.

* * * * *